UNITED STATES PATENT OFFICE.

WILHELM HERZBERG, OF SCHÖNEBERG, NEAR BERLIN, AND WERNER LANGE, OF TREPTOW, NEAR BERLIN, GERMANY, ASSIGNORS TO ACTIEN GESELLSCHAFT FÜR ANILIN FABRIKATION, OF BERLIN, GERMANY.

TETRAKISAZO DYE.

997,061.   Specification of Letters Patent.   Patented July 4, 1911.

No Drawing.   Application filed March 18, 1911.  Serial No. 615,408.

*To all whom it may concern:*

Be it known that we, WILHELM HERZBERG and WERNER LANGE, subjects of the German Emperor, residing, respectively, at Schöneberg, near Berlin, and Treptow, near Berlin, Germany, our post-office addresses being, respectively, Landshuterstrasse 24, Schöneberg, near Berlin, and Bouchéstrasse 14, Treptow, near Berlin, Germany, have invented certain new and useful Improvements in Tetrakisazo Dye, of which the following is a specification.

Our invention relates to the manufacture of valuable dyes for cotton, which may be obtained by combining with two molecular proportions of a meta-diamin of the benzene series one molecular proportion of a tetrazotized dye made from two molecular proportions of a diazotized amino-acid and one molecular proportion of a symmetrical 3.3'-diaminodiaryl-urea of the benzene series. The tetrakisazo dyes thus manufactured produce on cotton directly red-brown tints, which by subsequent treatment with 4-nitrodiazobenzene become deep red-brown of excellent fastness to washing and to light.

The following example serves to illustrate our invention, the parts being by weight: 17.3 parts of metanilic acid are diazotized and mixed with 12 parts of symmetrical 3.3'-diaminodiphenyl-urea, dissolved in 10 parts of hydrochloric acid of 20° Baumé specific gravity and 50 parts of water. The combination begins immediately and is completed by introducing sodium acetate until free hydrochloric acid has disappeared. 25 parts of hydrochloric acid are now added, the mixture is tetrazotized by means of 7 parts of sodium nitrite and the tetrazo solution is run into a solution of 11 parts of metaphenylenediamin, made alkaline with sodium carbonate. When the combination is completed the dye is salted out hot and drained. It dyes cotton directly red-brown tints, which by subsequent treatment with 4-nitrodiazobenzene become a powerful red-brown.

The new tetrakis-azo dye as above obtained, which is in the dry shape a brownish-black powder, dissolves in water to a brown solution which on the addition of soda-lye assumes a little more reddish brown color, whereas by the addition of sulfuric acid brown flakes are separated. In concentrated sulfuric acid it dissolves to a blue solution; on the addition of ice at first the color turns to violet, then brown flakes are separated. The aqueous solution of the dye is decolorized by the addition of stannous chlorid and hydrochloric acid, the dye thus being split up, yielding metanilic acid, triaminobenzene and symmetrical 2.5,2'.5'-tetraminodiphenylurea.

It is obvious to those skilled in the art that our present invention is not limited to the foregoing example or to the details given therein. It may be stated that instead of metanilic acid other amino-acids, instead of 3.3'-diaminodiphenylurea other 3.3'-diaminodiarylureas of the benzene series, such as the homologues and other substitution products of the said diaminodiphenylurea, adapted for combining with diazo compounds may be used. For the phenylenediamin toluylenediamin and chlorophenylenediamin may be substituted.

Having now described the invention and the manner in which it may be performed what we claim is,—

1. As new articles of manufacture the hereinbefore-described new tetrakis-azo dyes which may be obtained by combining with two molecular proportions of a meta-diamin of the benzene series one molecular proportion of a tetrazotized dye made from two molecular proportions of a diazotized amino-acid and one molecular proportion of a symmetrical 3.3'-diaminodiaryl-urea of the benzene series, these new dyes producing on cotton directly red-brown tints, which by subsequent treatment with 4-nitrodiazobenzene become deep brown, which new dyes when pulverized are brownish-black powders soluble in water to brown solutions, which on the addition of a mineral acid separate the free acids of the dyes, and which dyes are soluble in concentrated sulfuric acid to blue solutions, on the addition of ice at first turning to violet solutions, whereupon the free acids of the dyes separate, which dyes by reduction yield the amino acids employed as starting material besides symmetrical 2.5,2'.5'-tetraminodiarylurea of the benzene series and 1.2.4-triamins of the benzene series.

2. As a new article of manufacture the herein-described new tetrakis-azo dye which may be obtained by combining with two molecular proportions of phenylenediamin one molecular proportion of the tetrazotized dye made from two molecular proportions of diazotized metanilic acid and one molecular proportion of symmetrical 3.3'-diaminodiphenyl-urea, which new dye produces on cotton directly red-brown tints, which by subsequent treatment with 4-nitrodiazobenzene becomes deep brown, which new dye when pulverized is a brownish-black powder soluble in water to a brown solution, which on the addition of a mineral acid separates the free acid of the dye and which dye is soluble in concentrated sulfuric acid to a blue solution, on the addition of ice at first turning to a violet solution, whereupon the free acid of the dye separates, which dye by reduction yields metanilic acid besides symmetrical 2.5,2'.5'-tetraminodiphenylurea and 1.2.4-triaminobenzene.

In testimony whereof we have hereunto set our hands in presence of two subscribing witnesses.

WILHELM HERZBERG.
WERNER LANGE.

Witnesses:
WOLDEMAR HAUPT,
HENRY HASPER.